United States Patent
Kimba Dit Adamou et al.

(10) Patent No.: US 12,212,998 B2
(45) Date of Patent: Jan. 28, 2025

(54) MEASUREMENT CONFIGURATION METHOD, DEVICE, AND SYSTEM

(71) Applicant: VIVO MOBILE COMMUNICATION CO., LTD., Dongguan (CN)

(72) Inventors: Boubacar Kimba Dit Adamou, Dongguan (CN); Xiaodong Yang, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 0 days.

(21) Appl. No.: 18/440,938

(22) Filed: Feb. 13, 2024

(65) Prior Publication Data

US 2024/0187907 A1    Jun. 6, 2024

Related U.S. Application Data

(63) Continuation of application No. 17/202,384, filed on Mar. 16, 2021, now Pat. No. 11,937,111, which is a continuation of application No. PCT/CN2019/105441, filed on Sep. 11, 2019.

(30) Foreign Application Priority Data

Sep. 21, 2018    (CN) .......................... 201811110241.6

(51) Int. Cl.
*H04W 24/10*    (2009.01)
*H04L 1/00*    (2006.01)
*H04W 76/11*    (2018.01)

(52) U.S. Cl.
CPC ........... *H04W 24/10* (2013.01); *H04L 1/0026* (2013.01); *H04W 76/11* (2018.02)

(58) Field of Classification Search
CPC ..... H04W 24/10; H04W 76/11; H04W 24/02; H04W 24/08; H04L 1/0026; H04L 5/00; H04L 5/0053
See application file for complete search history.

(56) References Cited

U.S. PATENT DOCUMENTS

| | | |
|---|---|---|
| 2015/0358846 A1 | 12/2015 | Wu |
| 2018/0018953 A1 | 1/2018 | Todd et al. |
| 2018/0098253 A1* | 4/2018 | Huang ............... H04W 36/0088 |
| 2020/0178101 A1* | 6/2020 | Kodali .................. H04W 48/12 |
| 2020/0389937 A1* | 12/2020 | Liu ....................... H04W 48/18 |

FOREIGN PATENT DOCUMENTS

| | | |
|---|---|---|
| CN | 102223666 A | 10/2011 |
| CN | 103546905 A | 1/2014 |
| CN | 107484198 A | 12/2017 |
| CN | 108282810 A | 7/2018 |

* cited by examiner

*Primary Examiner* — Kyaw Z Soe
(74) *Attorney, Agent, or Firm* — IPX PLLC

(57) ABSTRACT

Embodiments of the present disclosure provide a measurement configuration method, a device, and a system, and relate to the field of communications technologies. The measurement configuration method includes obtaining priorities of M pieces of measurement indication information, and measuring, according to the priorities of the M pieces of measurement indication information, a to-be-measured frequency corresponding to target measurement indication information, where M is an integer greater than or equal to 1.

12 Claims, 4 Drawing Sheets

MEASUREMENT CONFIGURATION METHOD, DEVICE, AND SYSTEM

CROSS-REFERENCE TO RELATED APPLICATIONS

This application is a continuation of U.S. application Ser. No. 17/202,384, filed on Mar. 16, 2021, which is a continuation of PCT Application No. PCT/CN2019/105441, filed on Sep. 11, 2019, which claims priority to Chinese Patent Application No. 201811110241.6, filed on Sep. 21, 2018. The entire contents of each of the above-identified applications are expressly incorporated herein by reference.

TECHNICAL FIELD

Embodiments of the present disclosure relate to the field of communications technologies, and in particular, to a measurement configuration method, a device, and a system.

BACKGROUND

In Carrier Aggregation (CA) scenarios of a Long Term Evolution (LTE) system and a New Radio (NR) system, a base station in a system can configure, only for User Equipment (UE) in a non-connected state, measurement information of measuring a cell in the system.

Generally, if a base station (briefly referred to as LTE base station below) in the LTE system needs to configure a cell (briefly referred to as NR cell below) in the NR system for UE in the non-connected state, because the LTE base station cannot configure, for the UE, measurement information of measuring the NR cell, according to an S criterion in a communications protocol, the UE may measure multiple frequencies of the LTE cell and multiple frequencies of the NR cell to obtain measurement results of the multiple frequencies of the LTE cell and measurement results of the multiple frequencies of the NR cell.

However, when a base station needs UE to report a measurement result of a cell (for example, an NR cell) in a system, because UE in the non-connected state measures multiple frequencies of a cell in each system that the UE accesses (for example, multiple frequencies of an LTE cell and multiple frequencies of an NR cell), the UE may perform unnecessary measurement on multiple frequencies of another cell (for example, multiple frequencies of an LTE cell), resulting in a resource waste.

SUMMARY

A first aspect of the embodiments of the present disclosure provides a measurement configuration method, applied to UE, where the measurement configuration method includes: obtaining priorities of M pieces of measurement indication information; and measuring, according to the priorities of the M pieces of measurement indication information, a to-be-measured frequency corresponding to target measurement indication information, where M is an integer greater than or equal to 1.

A second aspect of the embodiments of the present disclosure provides a measurement configuration method, applied to a network side device, where the measurement configuration method includes: sending measurement configuration information to UE, where the measurement configuration information is used to indicate priorities of M pieces of measurement indication information, the measurement configuration information is used by the UE to measure a to-be-measured frequency corresponding to target measurement indication information, and M is an integer greater than or equal to 1.

A third aspect of the embodiments of the present disclosure provides UE, where the UE may include: an obtaining unit and a measurement unit. A receiving unit is configured to obtain priorities of M pieces of measurement indication information. The measurement unit is configured to measure, according to the priorities of the M pieces of measurement indication information obtained by the obtaining unit, a to-be-measured frequency corresponding to target measurement indication information, where M is an integer greater than or equal to 1.

A fourth aspect of the embodiments of the present disclosure provides a network side device, where the network side device may include a sending unit. The sending unit is configured to send measurement configuration information to UE, where the measurement configuration information is used to indicate priorities of M pieces of measurement indication information, the measurement configuration information is used by the UE to measure a to-be-measured frequency corresponding to target measurement indication information, and M is an integer greater than or equal to 1.

A fifth aspect of the embodiments of the present disclosure provides UE, where the UE includes: a processor, a memory, and a computer program that is stored in the memory and that is executable on the processor. When the computer program is executed by the processor, steps of the measurement configuration method in the first aspect are implemented.

A sixth aspect of the embodiments of the present disclosure provides a network side device, where the network side device includes: a processor, a memory, and a computer program that is stored in the memory and that is executable on the processor. When the computer program is executed by the processor, steps of the measurement configuration method in the second aspect are implemented.

A seventh aspect of the embodiments of the present disclosure provides a communications system, where the communications system includes the UE described in the third aspect and the network side device described in the fourth aspect; or the communications system includes the UE described in the fifth aspect and the network side device described in the sixth aspect.

An eighth aspect of the embodiments of the present disclosure provides a computer readable storage medium. The computer readable storage medium stores a computer program. When the computer program is executed by a processor, steps of the measurement configuration method in the first aspect are implemented, or steps of the measurement configuration method in the second aspect are implemented.

DETAILED DESCRIPTION

The following describes the embodiments of the present disclosure with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure without creative efforts shall fall within the protection scope of this application.

In the description of the embodiments of the present disclosure, unless otherwise specified, "multiple" means two or more.

The term "and/or" in this specification describes an association relationship between associated objects, indicating that three relationships may exist. For example, A and/or B may indicate the following three cases: Only A exists, both A and B exist, and only B exists. A character "/" in this specification indicates an "or" relationship between associated objects. For example, A/B indicates A or B.

In the embodiments of the present disclosure, the term such as "exemplary" or "for example" is used to indicate an example, an instance, or a description. Any embodiment or design solution described as "exemplary" or "for example" in the embodiments of the present disclosure should not be construed as being more preferred than or superior to other embodiments or design solutions. To be precise, the use of the term such as "exemplary" or "for example" is intended to present a related concept in a specific manner.

Embodiments of the present disclosure provide a measurement configuration method, a device, and a system. UE can obtain priorities of M pieces of measurement indication information and measure, according to the priorities of the M pieces of measurement indication information, a to-be-measured frequency corresponding to target measurement indication information. Because the UE can measure, according to the obtained priorities of the M pieces of measurement indication information, the to-be-measured frequency corresponding to the target measurement indication information, instead of measuring multiple to-be-measured frequencies of cells in all systems, it can be avoided that the UE performs unnecessary measurement on a to-be-measured frequency other than the to-be-measured frequency corresponding to the target measurement indication information, to save a resource during measurement of the UE.

The measurement configuration method, the device, and the system provided in the embodiments of the present disclosure can be applied to a communications system. Specifically, the measurement configuration method, the device, and the system can be applied to a process of measuring, by the UE according to the obtained priorities of the M pieces of measurement indication information and based on the communications system, the to-be-measured frequency corresponding to the target measurement indication information.

Figure 1:
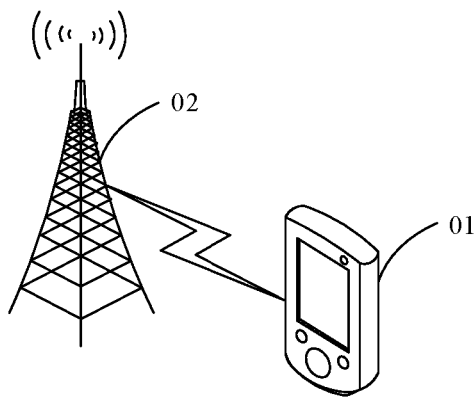
FIG. 1 is a schematic architectural diagram of a communications system according to an embodiment of the present disclosure.

FIG. 1 is a schematic architectural diagram of a communications system according to an embodiment of the present disclosure. As shown in FIG. 1, the communications system may include UE 01 and a network side device 02. The UE 01 and the network side device 02 may establish a connection and communicate with each other.

The UE is a device providing voice and/or data connectivity to a user, a handheld device having a wired/wireless connection function, or another processing device connected to a wireless modem. The UE may communicate with one or more core network devices by using a Radio Access Network (RAN). The UE may be a mobile terminal such as a mobile phone (or referred to as a "cellular" phone) or a computer having a mobile terminal, or may be a portable, pocket-sized, handheld, computer built-in, or vehicle-mounted mobile apparatus that exchanges language and/or data with the RAN, for example, a Personal Communication Service (PCS) phone, a cordless phone, a Session Initiation Protocol (SIP) phone, a Wireless Local Loop (WLL) station, or a Personal Digital Assistant (PDA). The UE may be alternatively referred to as a user agent, a terminal device, or the like.

The network side device may be a base station. The base station is an apparatus deployed in the RAN to provide a wireless communication function for UE. The base station may include various forms of macro base stations, micro base stations, relay stations, access points, and the like. In systems using different wireless access technologies, names of devices having a base station function may be different. For example, in a 3rd Generation mobile communications (3G) network, the device is referred to as a Node B, in an LTE system, the device is referred to as an evolved NodeB (eNB or eNodeB), and in a 5th Generation mobile communications (5G) network, the device is referred to as a gNB. With evolution of the communications technology, the name of the "base station" may change.

The following describes, in detail with reference to the accompanying drawings by using specific embodiments and application scenarios of the embodiments, the measurement configuration method, the device, and the system provided in the embodiments of the present disclosure.

Figure 2:
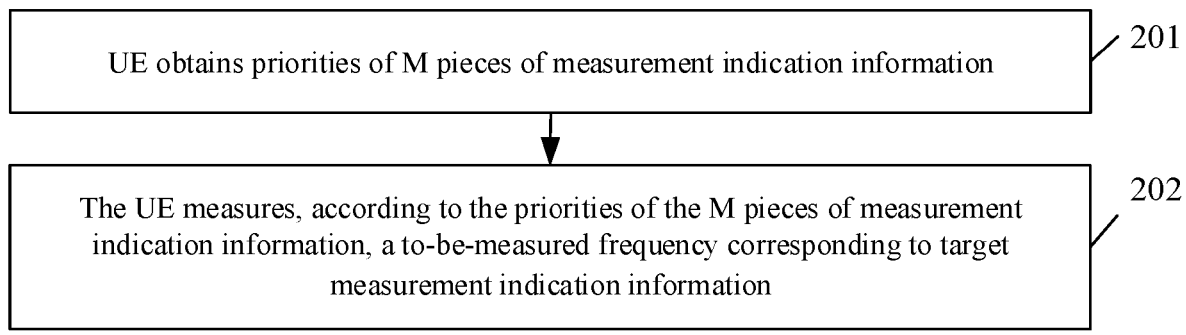
FIG. 2 is a flowchart of a measurement configuration method according to an embodiment of the present disclosure.

Based on the communications system shown in FIG. 1, an embodiment of the present disclosure provides a measurement configuration method. As shown in FIG. 2, the measurement configuration method may include the following step 201 and step 202.

Step 201: UE obtains priorities of M pieces of measurement indication information.

In this embodiment of the present disclosure, the priorities of the M pieces of measurement indication information may be predefined, or configured by a network side device for the UE, or determined by the UE according to a preset rule.

Figure 3:
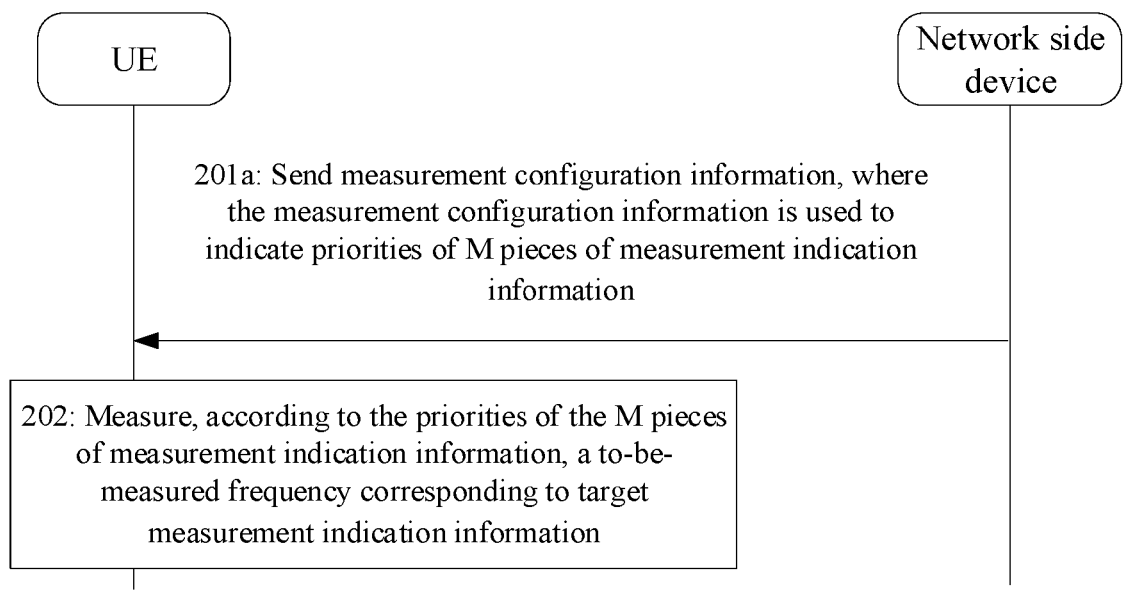
FIG. 3 is a schematic diagram of a measurement configuration method according to an embodiment of the present disclosure.

In this embodiment of the present disclosure, with reference to FIG. 2, as shown in FIG. 3, step 201 may be specifically implemented by using step 201*a*.

Step 201*a*: The network side device sends measurement configuration information to the UE, where the measurement configuration information is used to indicate the priorities of the M pieces of measurement indication information.

In this embodiment of the present disclosure, the measurement configuration information is used by the UE to measure a to-be-measured frequency corresponding to target measurement indication information, and M is an integer greater than or equal to 1.

In this embodiment of the present disclosure, in Dual Connectivity (DC)/carrier aggregation scenarios of different systems (for example, an LTE system and an NR system), when the network side device configures a cell of a system for the UE, the network side device may send the measurement configuration information to UE, so that the UE can measure, according to the measurement configuration information, the to-be-measured frequency corresponding to the target measurement indication information.

In this embodiment of the present disclosure, the target measurement indication information may be at least one of the M pieces of measurement indication information.

It may be understood that in this embodiment of the present disclosure, the network side device may indicate the priorities of the M pieces of measurement indication information to the UE by using the measurement configuration information.

In this embodiment of the present disclosure, each of the M pieces of measurement indication information is any one of the following: a Radio Access Technology (RAT) type, a to-be-measured frequency, a RAT type and at least one to-be-measured frequency corresponding to the RAT type, a cell identifier, and a RAT type and at least one cell identifier corresponding to the RAT type.

In this embodiment of the present disclosure, the RAT type may include an LTE type and an NR type.

In this embodiment of the present disclosure, the network side device may be a base station in the LTE system or a base station in the NR system.

Correspondingly, the UE receives the measurement configuration information sent by the network side device. The measurement configuration information is used to indicate the priorities of the M pieces of measurement indication information.

In this embodiment of the present disclosure, the network side device may send one piece of indication information to the UE to indicate the M pieces of measurement indication information to the UE, and the UE can determine the priorities of the M pieces of measurement indication information according to a preset rule.

It should be noted that in this embodiment of the present disclosure, in a DC/CA (for example, EN-DC CA, NGEN-DC CA, NE-DC CA, or UE-UE CA) scenario of a heterogeneous network (namely, a network with different RAT types), the network side device may indicate a RAT type to the UE, where CA measurement is performed for a priority of a cell and/or a frequency of the RAT type, so that the UE can perform measurement in a non-connected state in a DC/CA first (early) manner.

Step 202: The UE measures, according to the priorities of the M pieces of measurement indication information, the to-be-measured frequency corresponding to the target measurement indication information.

In this embodiment of the present disclosure, the target measurement indication information is at least one of the M pieces of measurement indication information, and M is an integer greater than or equal to 1.

It may be understood that in an embodiment of the present disclosure, that the UE measures the to-be-measured frequency corresponding to the target measurement indication information may be understood as that the UE measures a parameter such as signal quality and intensity of a measurement signal on the to-be-measured frequency corresponding to the target measurement indication information.

It should be noted that in this embodiment of the present disclosure, for a specific method for measuring, by the UE, the parameter such as the signal quality and intensity of the measurement signal, refer to the related descriptions in the prior art. Details are not described in this embodiment of the present disclosure.

In this embodiment of the present disclosure, when the UE is in the non-connected state, the UE may measure, according to the priorities of the M pieces of measurement indication information, the to-be-measured frequency corresponding to the target measurement indication information.

In this embodiment of the present disclosure, the M pieces of measurement indication information can be M RAT types, M to-be-measured frequencies, or M cell identifiers.

In this embodiment of the present disclosure, if the M pieces of measurement indication information are M RAT types, the UE may measure, according to priorities of the M RAT types, a to-be-measured frequency corresponding to a target RAT type (the target RAT type is at least one of the M RAT types).

For example, if the M RAT types are an NR type and an LTE type, and a sequence of the priorities is the NR type and the LTE type, UE may measure to-be-measured frequencies corresponding to all cells (referred to as NR cell below) of the NR type (the NR cell belongs to one RAT type in the NR type and the LTE type).

In this embodiment of the present disclosure, if the M pieces of measurement indication information are M to-be-measured frequencies, the UE may measure a target to-be-measured frequency (the target to-be-measured frequency is at least one of the M to-be-measured frequencies) according to priorities of the M to-be-measured frequencies.

For example, if the M to-be-measured frequencies are a frequency 1, a frequency 2, and a frequency 3, and a sequence of the priorities is the frequency 2, the frequency 3, and the frequency 1, the UE can measure the frequency 2 and the frequency 3 (the frequency 2 and frequency 3 are two to-be-measured frequencies in the frequency 1, the frequency 2, and the frequency 3).

In this embodiment of the present disclosure, if the M pieces of measurement indication information are M cell identifiers, the UE can measure, according to priorities of the M cell identifiers, a to-be-measured frequency corresponding to a target cell identifier (the target cell identifier is at least one of the M cell identifiers).

For example, if the M cell identifiers are a cell identifier 1, a cell identifier 2, and a cell identifier 3, and a sequence of the priorities is the cell identifier 1, the cell identifier 3, and the cell identifier 2, the UE can measure a to-be-measured frequency corresponding to the cell identifier 1 (the cell identifier 1 is one cell identifier in the cell identifier 1, the cell identifier 2, and the cell identifier 3).

In this embodiment of the present disclosure, the M pieces of measurement indication information may be at least one RAT type, at least one to-be-measured frequency, and at least one cell identifier, and a total quantity of the RAT type, the to-be-measured frequency, and the cell identifier is M.

In this embodiment of the present disclosure, the M pieces of measurement indication information may be K RAT types and at least one to-be-measured frequency corresponding to the K RAT types. K is a positive integer. If K=1, M is a quantity of the to-be-measured frequencies, or if K>1, M is a sum of the quantity of the to-be-measured frequencies and K.

For example, it is assumed that M=2. If K (K=1) RAT types are the NR type, at least one to-be-measured frequency (for example, two to-be-measured frequencies) corresponding to the NR type is a frequency 4 and a frequency 5, and a sequence of priorities is the frequency 5 and the frequency 4, the UE may measure the frequency 5 (the frequency 5 is one to-be-measured frequency in the frequency 4 and the frequency 5).

For example, it is assumed that M=5. If K (K=2) RAT types are the NR type and the LTE type, at least one to-be-measured frequency (for example, two to-be-measured frequencies) corresponding to the NR type are a frequency 6 and a frequency 7, at least one to-be-measured frequency (for example, three to-be-measured frequencies) corresponding to the LTE type are a frequency 8, a frequency 9, and a frequency 10, and a sequence of priorities is the frequency 7, the frequency 6, the frequency 9, the frequency 10, and the frequency 8, the UE may measure the frequency 7 and the frequency 6 (the frequency 7 and the frequency 6 are two to-be-measured frequencies in the frequency 7, the frequency 6, the frequency 9, the frequency 10, and the frequency 8).

It should be noted that for a specific method for determining, by the UE, the target measurement indication information according to the priorities of the M pieces of measurement indication information, refer to the descriptions in the following embodiments. Details are not described herein.

This embodiment of the present disclosure provides the measurement configuration method. The UE can obtain the priorities of the M pieces of measurement indication information and measure, according to the priorities of the M pieces of measurement indication information, the to-be-measured frequency corresponding to the target measurement indication information. Because the UE can measure, according to the obtained priorities of the M pieces of measurement indication information, the to-be-measured frequency corresponding to the target measurement indication information, instead of measuring multiple measurement frequencies of cells of all systems, it can be avoided that the UE performs unnecessary measurement on a to-be-measured frequency other than the to-be-measured frequency corresponding to the target measurement indication information, to save a resource during measurement of the UE.

Figure 4:
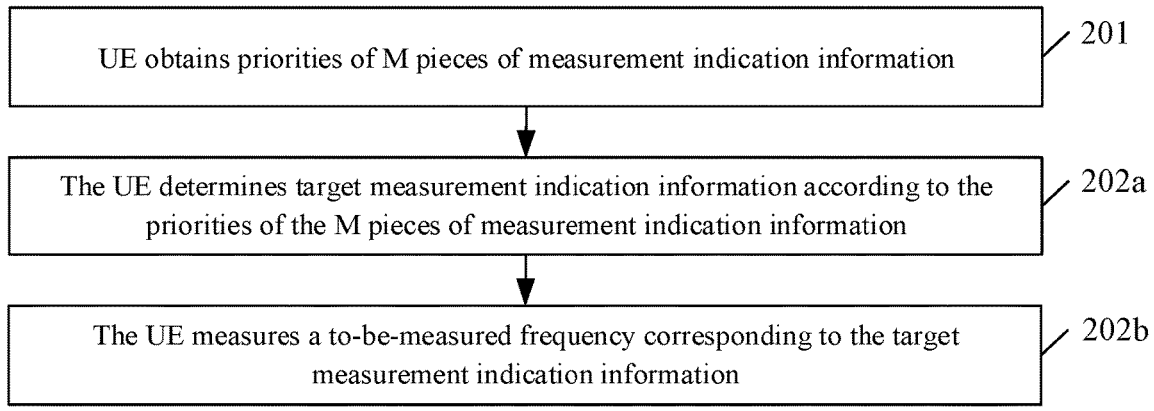
FIG. 4 is a flowchart of a measurement configuration method according to an embodiment of the present disclosure.

In this embodiment of the present disclosure, with reference to FIG. 2, as shown in FIG. 4, step 202 may be specifically implemented by using step 202a and step 202b.

Step 202a: The UE determines the target measurement indication information according to the priorities of the M pieces of measurement indication information.

Step 202b: The UE measures the to-be-measured frequency corresponding to the target measurement indication information.

In this embodiment of the present disclosure, the UE may first determine the target measurement indication information according to the priorities of the M pieces of measurement indication information, and then measure the to-be-measured frequency corresponding to the target measurement indication information, to avoid that the UE performs unnecessary measurement on a to-be-measured frequency other than the to-be-measured frequency corresponding to the target measurement indication information.

Figure 5:
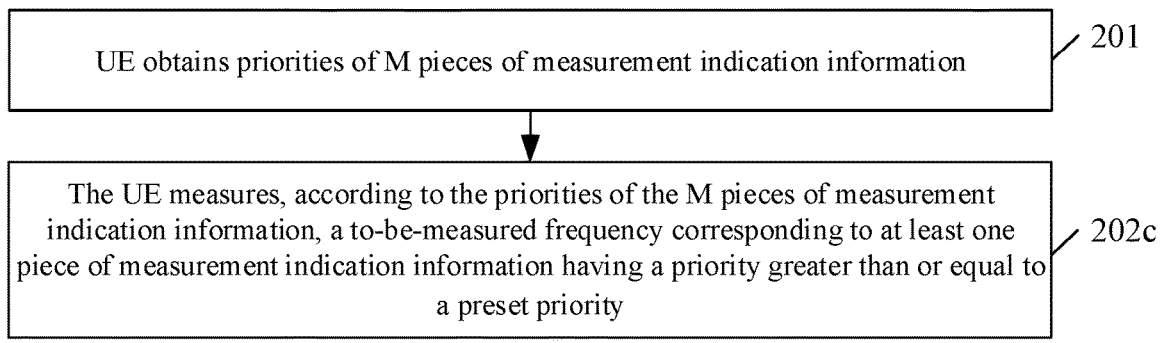
FIG. 5 is a flowchart of a measurement configuration method according to an embodiment of the present disclosure.

In an implementation of this embodiment of the present disclosure, with reference to FIG. 2, as shown in FIG. 5, step 202 may be specifically implemented by using step 202c.

Step 202c: The UE measures, according to the priorities of the M pieces of measurement indication information, a to-be-measured frequency corresponding to at least one piece of measurement indication information having a priority greater than or equal to a preset priority.

The target measurement indication information is the at least one piece of measurement indication information having a priority greater than or equal to the preset priority in the M pieces of measurement indication information.

It may be understood that a quantity of the at least one piece of measurement indication information in step 202c may be specifically determined according to a value of the preset priority.

In this embodiment of the present disclosure, the target RAT type is at least one RAT type having a priority greater than or equal to the preset priority in the M RAT types.

In this embodiment of the present disclosure, the target to-be-measured frequency is at least one to-be-measured frequency having a priority greater than or equal to the preset priority in the M to-be-measured frequencies.

In this embodiment of the present disclosure, the target cell identifier is at least one cell identifier having a priority greater than or equal to the preset priority in the M cell identifiers.

In this embodiment of the present disclosure, the UE may use the at least one piece of measurement indication information having a priority greater than or equal to the preset priority as the target measurement indication information, and then measure the to-be-measured frequency corresponding to the target measurement indication information, to avoid that the UE performs unnecessary measurement on a to-be-measured frequency other than the to-be-measured frequency corresponding to the target measurement indication information.

Figure 6:
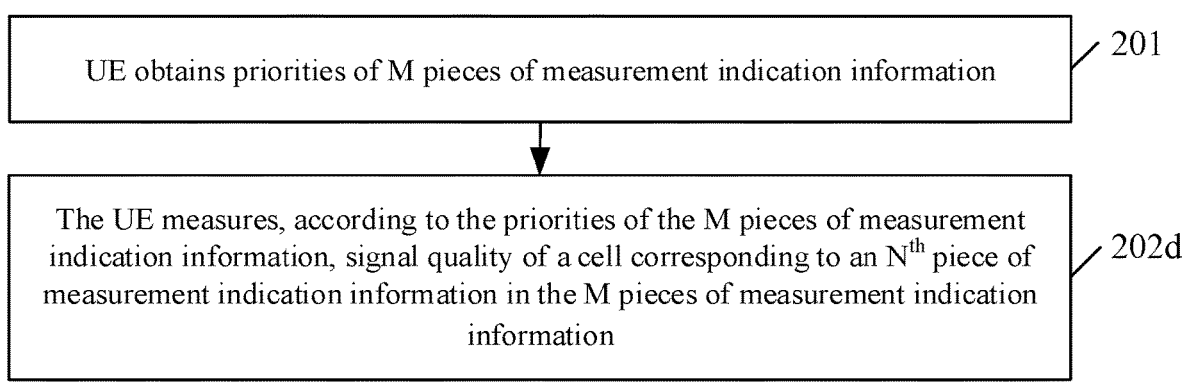
FIG. 6 is a flowchart of a measurement configuration method according to an embodiment of the present disclosure.

In another possible implementation of this embodiment of the present disclosure, with reference to FIG. 2, as shown in FIG. 6, step 202 may be specifically implemented by using step 202d.

Step 202d: The UE measures, according to the priorities of the M pieces of measurement indication information, signal quality of a cell corresponding to an $N^{th}$ piece of measurement indication information in the M pieces of measurement indication information.

When the signal quality of the cell corresponding to the $N^{th}$ piece of measurement indication information is greater than or equal to a preset threshold, the target measurement indication information is the $N^{th}$ piece of measurement indication information, where N is a positive integer less than M.

It may be understood that after the UE obtains the priorities of the M pieces of measurement indication information, it may be determined whether signal quality of each cell corresponding to the M pieces of measurement indication information is greater than or equal to the preset threshold.

In this embodiment of the present disclosure, when the signal quality of the cell corresponding to the $N^{th}$ piece of measurement indication information is less than the preset threshold, the UE may measure signal quality of a cell corresponding to an (N+1)th piece of measurement indication information in the M pieces of measurement indication information.

It may be understood that in this embodiment of the present disclosure, when the signal quality of the cell corresponding to the (N+1)th piece of measurement indication information is greater than or equal to the preset threshold, the target measurement indication information is the (N+1)th piece of measurement indication information.

In this embodiment of the present disclosure, when the signal quality of the cell corresponding to the (N+1)th piece of measurement indication information is less than the preset threshold, the UE may measure signal quality of a cell corresponding to an (N+2)th piece of measurement indication information in the M pieces of measurement indication information until signal quality that is of a cell corresponding to measurement indication information and that is measured by the UE is greater than or equal to the preset threshold, and the target measurement indication information is the measurement indication information.

In this embodiment of the present disclosure, the UE may measure, according to the priorities of the M pieces of measurement indication information, the signal quality of the cell corresponding to the $N^{th}$ piece of measurement indication information in M pieces of measurement indication information (when the signal quality of the cell corresponding to the $N^{th}$ piece of measurement indication information is greater than or equal to the preset threshold, the target measurement indication information is the $N^{th}$ piece of measurement indication information), to avoid that the UE performs unnecessary measurement on a to-be-measured frequency other than the to-be-measured frequency corresponding to the target measurement indication information.

Figure 7:
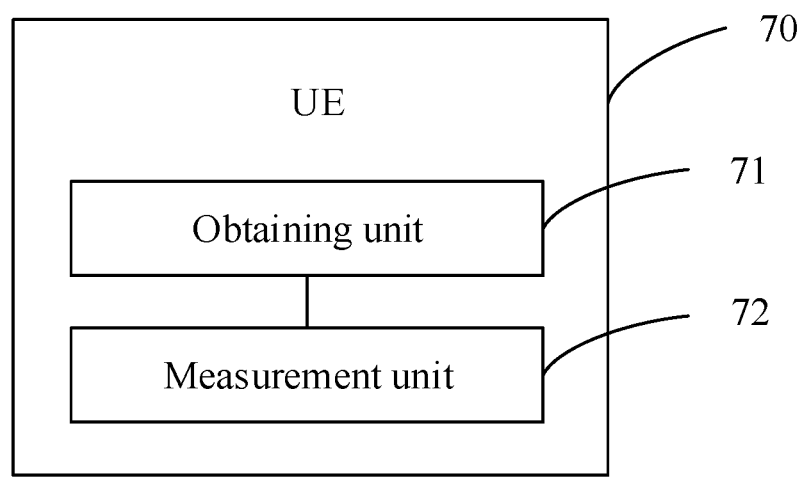
FIG. 7 is a block diagram of UE according to an embodiment of the present disclosure.

FIG. 7 is a schematic structural diagram of UE according to an embodiment of the present disclosure. As shown in FIG. 7, the UE 70 provided in this embodiment of the present disclosure may include an obtaining unit 71 and a measurement unit 72.

The obtaining unit 71 is configured to obtain priorities of M pieces of measurement indication information. The measurement unit 72 is configured to measure, according to the priorities of the M pieces of measurement indication information obtained by the obtaining unit 71, a to-be-measured frequency corresponding to target measurement indication information, where M is an integer greater than or equal to 1.

In an implementation, each of the M pieces of measurement indication information is any one of the following: a RAT type, a to-be-measured frequency, a RAT type and at least one to-be-measured frequency corresponding to the RAT type, a cell identifier, a RAT type and at least one cell identifier corresponding to the RAT type.

In an implementation, the priorities of the M pieces of measurement indication information may be predefined, or configured by a network side device for the UE, or determined by the UE according to a preset rule.

In an implementation, the target measurement indication information is at least one piece of the measurement indication information having a priority greater than or equal to a preset priority in the M pieces of measurement indication information.

In an implementation, the measurement unit 72 is specifically configured to measure, according to the priorities of the M pieces of measurement indication information obtained by the obtaining unit 71, signal quality of a cell corresponding to an $N^{th}$ piece of measurement indication information in the M pieces of measurement indication information, where N is a positive integer less than M. When the signal quality of the cell corresponding to the $N^{th}$ piece of measurement indication information is greater than or equal to a preset threshold, the target measurement indication information is the $N^{th}$ piece of measurement indication information.

In an implementation, the measurement unit 72 is further configured to: when the signal quality of the cell corresponding to the $N^{th}$ piece of measurement indication information is less than the preset threshold, measure signal quality of a cell corresponding to an $(N+1)^{th}$ piece of measurement indication information in the M pieces of measurement indication information.

In an implementation, the measurement unit 72 is specifically configured to: when the UE is in a non-connected state, measure, according to the priorities of the M pieces of measurement indication information obtained by the obtaining unit 71, the to-be-measured frequency corresponding to the target measurement indication information.

The UE provided in this embodiment of the present disclosure can implement processes implemented by the UE in the foregoing method embodiment. To avoid repetition, details are not described herein again.

This embodiment of the present disclosure provides the UE. The UE may obtain the priorities of the M pieces of measurement indication information and measure, according to the priorities of the M pieces of measurement indication information, the to-be-measured frequency corresponding to the target measurement indication information. Because the UE can measure, according to the obtained priorities of the M pieces of measurement indication information, the to-be-measured frequency corresponding to the target measurement indication information, instead of measuring multiple to-be-measured frequencies of cells of all systems, it can be avoided that the UE performs unnecessary measurement on a to-be-measured frequency other than the to-be-measured frequency corresponding to the target measurement indication information, to save a resource during measurement of the UE.

Figure 8:
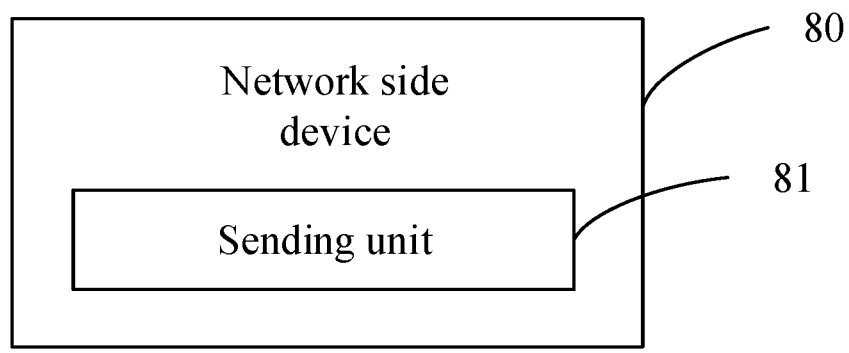
FIG. 8 is a block diagram of a network side device according to an embodiment of the present disclosure.

FIG. 8 is a schematic structural diagram of a network side device according to an embodiment of the present disclosure. As shown in FIG. 8, the network side device 80 provided in this embodiment of the present disclosure may include a sending unit 81.

The sending unit 81 is configured to send measurement configuration information to UE, where the measurement configuration information is used to indicate priorities of M pieces of measurement indication information, the measurement configuration information is used by the UE to measure a to-be-measured frequency corresponding to target measurement indication information, where M is an integer greater than or equal to 1.

In an implementation, each of the M pieces of measurement indication information is any one of the following: a RAT type, a to-be-measured frequency, a RAT type and at least one to-be-measured frequency corresponding to the RAT type, a cell identifier, a RAT type and at least one cell identifier corresponding to the RAT type.

The network side device provided in this embodiment of the present disclosure can implement processes implemented by the network side device in the foregoing method embodiment. To avoid repetition, details are not described herein again.

This embodiment of the present disclosure provides the network side device. The network side device may send the measurement configuration information (the measurement configuration information is used to indicate the priorities of the M pieces of measurement indication information) to the UE, so that the UE can measure, according to the priorities of the M pieces of measurement indication information indicated in the received measurement configuration information, the to-be-measured frequency corresponding to the target measurement indication information. Because after receiving the measurement configuration information sent by a base station, the UE can measure, according to the priorities of the M pieces of measurement indication information indicated in the measurement configuration information, the to-be-measured frequency corresponding to the target measurement indication information, instead of measuring multiple to-be-measured frequencies of cells of all systems, it can be avoided that the UE performs unnecessary measurement on a to-be-measured frequency other than the to-be-measured frequency corresponding to the target measurement indication information, to save a resource during measurement of the UE.

Figure 9:
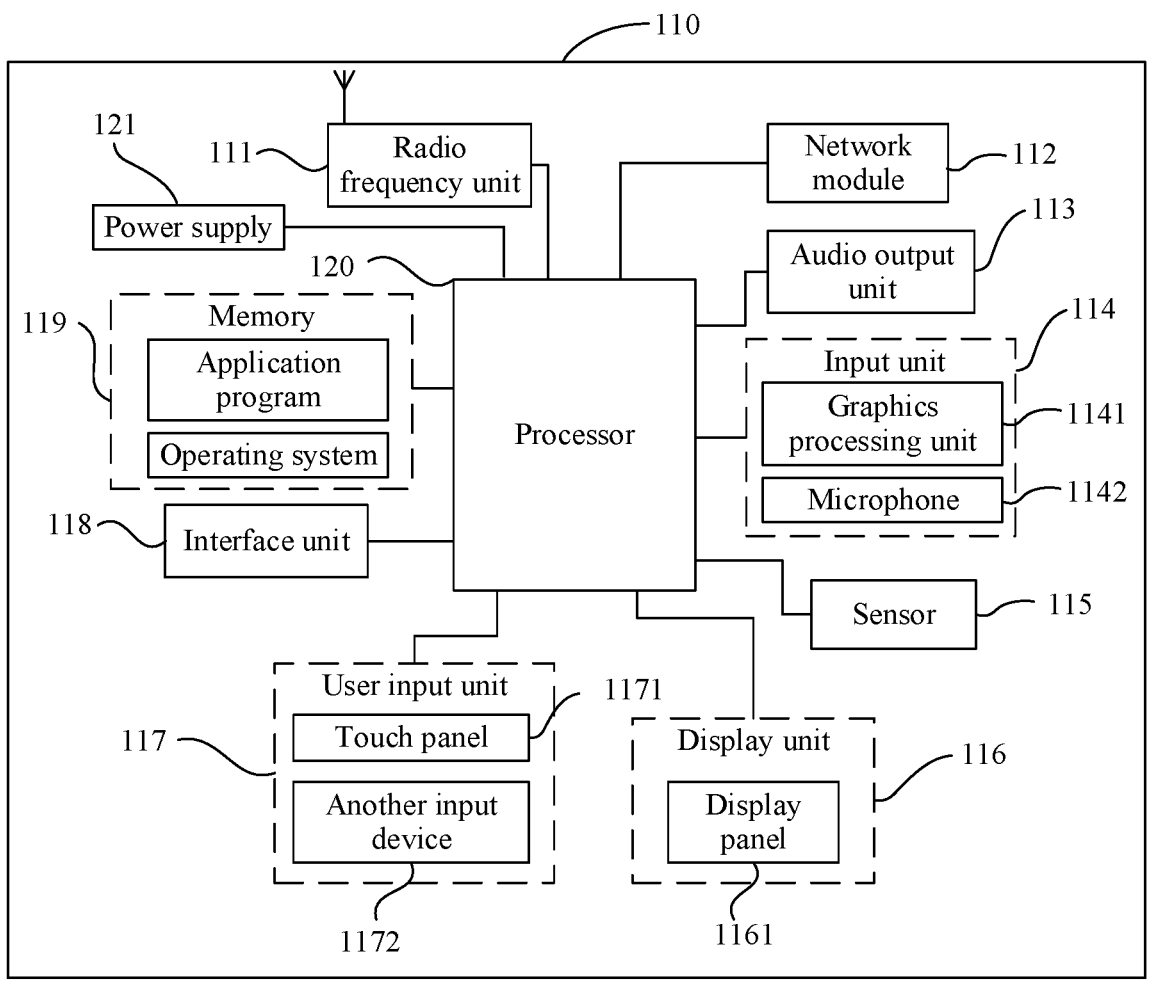
FIG. 9 is a block diagram of UE according to an embodiment of the present disclosure.

FIG. 9 is a schematic hardware diagram of UE according to an embodiment of the present disclosure. As shown in FIG. 9, the UE 110 includes but is not limited to components such as a radio frequency unit 111, a network module 112, an audio output unit 113, an input unit 114, a sensor 115, a display unit 116, a user input unit 117, an interface unit 118, a memory 119, a processor 120, and a power supply 121.

It should be noted that a person skilled in the art may understand that the structure of the UE shown in FIG. 9 does not constitute a limitation to the UE. The UE may include more or fewer components than those shown in FIG. 9, or some components may be combined, or a different component arrangement may be used. For example, in this embodiment of the present disclosure, the UE includes but is not limited to a mobile phone, a tablet computer, a notebook computer, a palmtop computer, a vehicle-mounted terminal, a wearable device, and a pedometer.

The processor 120 may be configured to obtain priorities of M pieces of measurement indication information, and measure, according to the priorities of the M pieces of measurement indication information, a to-be-measured frequency corresponding to target measurement indication information, where M is an integer greater than or equal to 1.

This embodiment of the present disclosure provides the UE. The UE may obtain the priorities of the M pieces of measurement indication information, and measure, according to the priorities of the M pieces of measurement indication information, the to-be-measured frequency corresponding to the target measurement indication information. Because the UE can measure, according to the obtained priorities of the M pieces of measurement indication information, the to-be-measured frequency corresponding to the target measurement indication information, instead of measuring multiple to-be-measured frequencies of cells of all systems, it can be avoided that the UE performs unnecessary measurement on a to-be-measured frequency other than the to-be-measured frequency corresponding to the target measurement indication information, to save a resource during measurement of the UE.

It should be understood that, in this embodiment of the present disclosure, the radio frequency unit 111 may be configured to receive and send information, or receive and send signals in a calling process. Specifically, after receiving downlink data from a base station, the radio frequency unit 111 sends the downlink data to the processor 120 for processing. In addition, the radio frequency unit 111 sends uplink data to the base station. Generally, the radio frequency unit 111 includes but is not limited to an antenna, at least one amplifier, a transceiver, a coupler, a low noise amplifier, and a duplexer. In addition, the radio frequency unit 111 may further communicate with a network and another device by using a wireless communications system.

The UE provides wireless broadband Internet access for a user by using the network module 112, for example, helps the user to receive and send emails, browse web pages, and access streaming media.

The audio output unit 113 may convert audio data received by the radio frequency unit 111 or the network module 112 or stored in the memory 119 into an audio signal, and output the audio signal into a sound. In addition, the audio output unit 113 may also provide an audio output (for example, a call signal receiving sound or a message receiving sound) related to a specific function performed by the UE 110. The audio output unit 113 includes a loudspeaker, a buzzer, a telephone receiver, and the like.

The input unit 114 is configured to receive an audio or video signal. The input unit 114 may include a Graphics Processing Unit (GPU) 1141 and a microphone 1142. The graphics processing unit 1141 is configured to process image data of a static picture or a video obtained by an image capture apparatus (for example, a camera) in video capturing mode or an image capturing mode. A processed image frame may be displayed on the display unit 116. The image frame processed by the graphics processing unit 1141 may be stored in the memory 119 (or another storage medium) or sent by using the radio frequency unit 111 or the network module 112. The microphone 1142 may receive a sound and can process the sound into audio data. The processed audio data may be converted, in a telephone calling mode, into a format output that can be sent to a mobile communications base station by using the radio frequency unit 111.

The UE 110 further includes at least one sensor 115, for example, a light sensor, a motion sensor, and another sensor. Specifically, the light sensor includes an ambient light sensor and a proximity sensor. The ambient light sensor may adjust brightness of a display panel 1161 according to brightness of ambient light, and the proximity sensor may turn off the display panel 1161 and/or backlight when the UE 110 is moved towards the ear. As a motion sensor, an accelerometer sensor may detect magnitude of acceleration in various directions (usually three axes), may detect magnitude and the direction of gravity when stationary, may be configured to identify UE postures (such as horizontal and vertical screen switch, related games, and magnetometer posture calibration), may perform functions related to vibration identification (for example, a pedometer and a knock), and the like. The sensor 115 may further include a fingerprint sensor, a pressure sensor, an iris sensor, a molecular sensor, a gyroscope, a barometer, a hygrometer, a thermometer, an infrared sensor, and the like. Details are not described herein.

The display unit 116 is configured to display information input by the user or information provided for the user. The display unit 116 may include the display panel 1161, and the display panel 1161 may be configured in a form of a Liquid Crystal Display (LCD), an Organic Light-Emitting Diode (OLED), or the like.

The user input unit 117 may be configured to receive input digit or character information, and generate key signal inputs related to user settings and function control of the UE. Specifically, the user input unit 117 includes a touch panel 1171 and another input device 1172. The touch panel 1171, also referred to as a touch screen, can collect a touch operation of the user on or near the touch panel 1171 (for example, an operation of the user on or near the touch panel 1171 by using any appropriate object or accessory such as a finger or a stylus). The touch panel 1171 may include two parts: a touch detection apparatus and a touch controller. The touch detection apparatus detects a touch position of the user, detects a signal brought by the touch operation, and transmits the signal to the touch controller. The touch controller receives touch information from the touch detection apparatus, converts the touch information into contact coordinates, transmits the contact coordinates to the processor 120, receives a command sent by the processor 120, and executes the command. In addition, the touch panel 1171 may be implemented by using a plurality of types such as a resistive type, a capacitive type, an infrared type, and a surface acoustic wave type. In addition to the touch panel 1171, the user input unit 117 may further include another input device 1172. Specifically, the another input device 1172 may include but is not limited to a physical keyboard, a function key (such as a volume control key or an on/off key), a trackball, a mouse, and a joystick. Details are not described herein again.

Further, the touch panel 1171 may cover the display panel 1161. When detecting a touch operation on or near the touch panel 1171, the touch panel 1171 transmits the touch operation to the processor 120 to determine a type of a touch event. Then, the processor 120 provides a corresponding visual output on the display panel 1161 based on the type of the touch event. Although in FIG. 9, the touch panel 1171 and the display panel 1161 implement input and output functions of the UE as two independent components, in some embodiments, the touch panel 1171 and the display panel 1161 may be integrated to implement the input and output functions of the UE. Details are not limited herein.

The interface unit 118 is an interface for connecting an external apparatus to the UE 110. For example, the external apparatus may include a wired or wireless headphone port, an external power supply (or a battery charger) port, a wired or wireless data port, a storage card port, a port used to connect to an apparatus having an identification module, an audio input/output (I/O) port, a video I/O port, a headset jack, and the like. The interface unit 118 may be configured to receive an input (for example, data information, and power) from the external apparatus and transmit the received input to one or more elements in the UE 110, or may be configured to transmit data between the UE 110 and the external apparatus.

The memory 119 may be configured to store a software program and various data. The memory 119 may mainly include a program storage area and a data storage area. The program storage area may store an operating system, an application program required by at least one function (for example, a sound play function or an image play function), and the like. The data storage area may store data (for example, audio data or an address book) or the like created based on use of a mobile phone. In addition, the memory 119 may include a high-speed random access memory, and may further include a non-volatile memory such as at least one magnetic disk storage component, a flash memory component, or another volatile solid-state storage component.

The processor 120 is a control center of the UE, connects various parts of the entire UE by using various interfaces and lines, and performs various functions of the UE and processes data by running or executing software programs and/or modules stored in the memory 119 and invoking data stored in the memory 119, to monitor the UE as a whole. The processor 120 may include one or more processing units. In some implementations, the processor 120 may integrate an application processor with a modem processor. The application processor mainly processes an operating system, a user interface, an application program, and the like, and the modem processor mainly processes wireless communication. It may be understood that the modem processor may not be integrated into the processor 120.

The UE 110 may further include the power supply 121 (for example, a battery) supplying power to various components. In some implementations, the power supply 121 may be logically connected to the processor 120 by using a power management system, to implement functions such as charging and discharging management and power consumption management by using the power management system.

In addition, the UE 110 includes some function modules not shown. Details are not described herein.

In some implementations, an embodiment of the present disclosure further provides UE, including the processor 120 and the memory 119 that are shown in FIG. 9, and a computer program that is stored in the memory 119 and that is executable on the processor 120. When the computer program is executed by the processor 120, the processes of the method embodiment are implemented, and a same technical effect can be achieved. To avoid repetition, details are not described herein again.

An embodiment of the present disclosure further provides a computer readable storage medium. The computer readable storage medium stores a computer program. When the computer program is executed by the processor 120 shown in FIG. 9, the processes of the method embodiment are implemented, and a same technical effect can be achieved. To avoid repetition, details are not described herein again. The computer readable storage medium may be a read-only memory (ROM), a random access memory (RAM), a magnetic disk, an optical disc, or the like.

Figure 10:
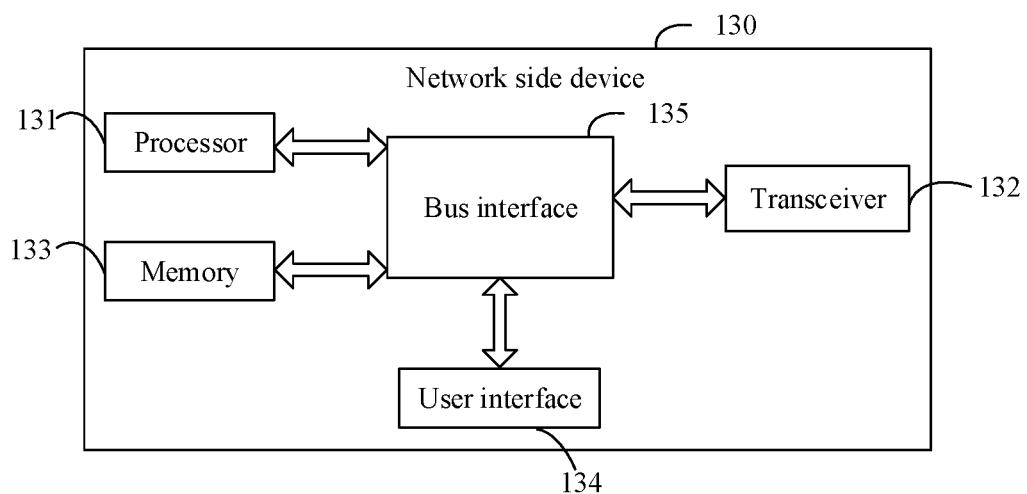
FIG. 10 is a block diagram of a network side device according to an embodiment of the present disclosure.

FIG. 10 is a schematic hardware diagram of a network side device according to an embodiment of the present disclosure. As shown in FIG. 10, the network side device 130 includes: a processor 131, a transceiver 132, a memory 133, a user interface 134, and a bus interface 135.

The transceiver 132 may be configured to send measurement configuration information to UE, where the measurement configuration information is used to indicate priorities of M pieces of measurement indication information, the measurement configuration information is used by the UE to measure a to-be-measured frequency corresponding to target measurement indication information, and M is an integer greater than or equal to 1.

This embodiment of the present disclosure provides the network side device. The network side device may send the measurement configuration information (the measurement configuration information is used to indicate the priorities of the M pieces of measurement indication information) to the UE, so that the UE can measure, according to the priorities of the M pieces of measurement indication information indicated in the received measurement configuration information, the to-be-measured frequency corresponding to the target measurement indication information. Because after receiving the measurement configuration information sent by a base station, the UE may measure, according to the priorities of the M pieces of measurement indication information indicated in the measurement configuration information, the to-be-measured frequency corresponding to the target measurement indication information, instead of measuring multiple to-be-measured frequencies of cells of all systems, it can be avoided that the UE performs unnecessary measurement on a to-be-measured frequency other than the to-be-measured frequency corresponding to the target measurement indication information, to save a resource during measurement of the UE.

The processor 131 may be responsible for managing a bus architecture and general processing, and the processor 131 may be configured to read and execute a program in the memory 133 to implement a processing function and control the network side device 130. The memory 133 may store data used by the processor 131 when the processor 131 performs an operation. The processor 131 and the memory 133 may be integrated together or disposed separately.

In this embodiment of the present disclosure, the network side device 130 may further include: a computer program that is stored in the memory 133 and that is executable on the processor 131. When the computer program is executed by the processor 131, steps of the methods provided in the embodiments of the present disclosure are implemented.

In FIG. 10, a bus architecture may include any quantity of interconnected buses and bridges, to connect various circuits of one or more processors represented by the processor 131 and a memory represented by the memory 133. The bus architecture may further connect various other circuits of a peripheral device, a voltage regulator, a power management circuit, and the like. These are well known in the art, and therefore are not further described in the embodiments of the present disclosure. The bus interface 135 provides an interface. The transceiver 132 may be a plurality of elements, that is, include a transmitter and a receiver, and provide units for communicating with various other apparatuses on a transmission medium. For different Ues, the user interface 134 may alternatively be an interface for externally and internally connecting required devices. The connected devices include but are not limited to a keypad, a display, a loudspeaker, a microphone, and a joystick.

An embodiment of the present disclosure further provides a computer readable storage medium. The computer readable storage medium stores a computer program. When the computer program is executed by the processor 131 shown in FIG. 10, the processes of the method embodiment are implemented, and a same technical effect can be achieved. To avoid repetition, details are not described herein again. The computer readable storage medium may be a ROM, a RAM, a magnetic disk, an optical disc, or the like.

It should be noted that in this specification, the terms "include," "comprise," or any other variant thereof is intended to cover a non-exclusive inclusion, so that a process, a method, an article, or an apparatus that includes a list of elements not only includes the elements, but also includes other elements that are not expressly listed, or further includes elements inherent to such process, method, article, or apparatus. In a case of no more constraints, an element limited by "includes one . . . " does not exclude the presence of an additional identical element in the process, method, article, or apparatus that includes the element.

Based on the foregoing descriptions of the embodiments, a person skilled in the art may clearly understand that the method in the foregoing embodiment may be implemented by software plus a necessary universal hardware platform or by hardware only. In some embodiments, the technical solutions of this application essentially, or the part contributing to the prior art may be implemented in a form of a software product. The computer software product is stored in a storage medium (for example, a ROM/RAM, a magnetic disk, or an optical disc), and includes a plurality of instructions for instructing a terminal (which may be a mobile phone, a computer, a server, an air conditioner, a network device, or the like) to perform the method described in the embodiments of this application.

The embodiments of this application are described above with reference to the accompanying drawings, but this application is not limited to the foregoing specific implementations. The foregoing specific implementations are merely exemplary instead of constituting any limitation. Under enlightenment of this application, a person of ordinary skill in the art may make many forms without departing from the purpose of this application or the protection scope of claims, and all of the forms fall within the protection of this application.

The invention claimed is:

1. A measurement configuration method, performed by User Equipment (UE), the method comprising:
   obtaining priorities of M pieces of measurement indication information and first indication information, wherein the first indication information is configured to indicate which Radio Access Technology (RAT) type of cell or frequency the UE performs measurements on; and
   when the UE is in a non-connected state, measuring, according to the priorities of the M pieces of measurement indication information and the first indication information, a to-be-measured frequency corresponding to target measurement indication information, wherein M is an integer greater than or equal to 1.

2. The method according to claim 1, wherein each of the M pieces of measurement indication information is any one of the following: the RAT type, the to-be-measured frequency, a RAT type and at least one to-be-measured frequency corresponding to the RAT type, a cell identifier, or the RAT type and at least one cell identifier corresponding to the RAT type.

3. The method according to claim 1, wherein the target measurement indication information includes at least one piece of measurement indication information in the M pieces of measurement indication information.

4. The method according to claim 1, wherein the M pieces of measurement indication information are configured by a network side device for the UE.

5. The method according to claim 1, wherein the RAT type of the target measurement indication information is the same as the RAT type indicated by the first indication information.

6. A measurement configuration method, performed by a network side device, the method comprising:
   sending measurement configuration information and first indication information to UE, wherein the measurement configuration information is configured to indicate priorities of M pieces of measurement indication information, the first indication information is configured to indicate which Radio Access Technology (RAT) type of cell or frequency the UE performs measurements on, the measurement configuration information, used by the UE, is configured to measure a to-be-measured frequency corresponding to target measurement indication information, and M is an integer greater than or equal to 1.

7. The method according to claim 6, wherein each of the M pieces of measurement indication information is any one of the following: the RAT type, the to-be-measured frequency, a RAT type and at least one to-be-measured frequency corresponding to the RAT type, a cell identifier, or the RAT type and at least one cell identifier corresponding to the RAT type.

8. User Equipment (UE), comprising: a processor, a memory, and a computer program that is stored in the memory and that is executable on the processor, wherein the computer program, when executed by the processor, causes the processor to:
   obtain priorities of M pieces of measurement indication information and first indication information, wherein the first indication information is configured to indicate which Radio Access Technology (RAT) type of cell or frequency the UE performs measurements on; and
   when the UE is in a non-connected state, measure, according to the priorities of the M pieces of measurement indication information and the first indication information, a to-be-measured frequency corresponding to target measurement indication information, wherein M is an integer greater than or equal to 1.

9. The UE according to claim 8, wherein each of the M pieces of measurement indication information is any one of the following: the RAT type, the to-be-measured frequency, a RAT type and at least one to-be-measured frequency corresponding to the RAT type, a cell identifier, or the RAT type and at least one cell identifier corresponding to the RAT type.

10. The UE according to claim 8, wherein the target measurement indication information includes at least one piece of measurement indication information in the M pieces of measurement indication information.

11. The UE according to claim 8, wherein the M pieces of measurement indication information are configured by a network side device for the UE.

12. The UE according to claim 8, wherein the RAT type of the target measurement indication information is the same as the RAT type indicated by the first indication information.

* * * * *